United States Patent
Wu et al.

(10) Patent No.: US 7,544,297 B2
(45) Date of Patent: Jun. 9, 2009

(54) FILTRATION DEVICE OF WATER PUMP

(76) Inventors: Ming-Jung Wu, 5F, No. 2, Lane 256, Syuansin St., Chiayi City (TW); Fang-Chia Chang, No. 18, Lane 86,. Jhengnan 2nd St., Yongkang City, Tainan County (TW)

( * ) Notice: Subject to any disclaimer, the term of this patent is extended or adjusted under 35 U.S.C. 154(b) by 51 days.

(21) Appl. No.: 11/707,115

(22) Filed: Feb. 16, 2007

(65) Prior Publication Data
US 2008/0197068 A1 Aug. 21, 2008

(51) Int. Cl.
B01D 29/56 (2006.01)
B01D 35/02 (2006.01)
F04D 29/70 (2006.01)

(52) U.S. Cl. .................. 210/416.1; 210/232; 415/121.2

(58) Field of Classification Search ................. 210/263, 210/282, 287, 314, 416.1, 416.2, 416.3, 232; 415/121.2
See application file for complete search history.

(56) References Cited

U.S. PATENT DOCUMENTS

| | | | |
|---|---|---|---|
| 3,736,075 A * | 5/1973 | Otto | 417/366 |
| 3,904,393 A * | 9/1975 | Morse | 210/167.23 |
| 3,939,075 A * | 2/1976 | Ginaven | 210/258 |
| 4,930,982 A * | 6/1990 | Channell | 415/121.2 |
| 5,861,093 A * | 1/1999 | Bennett | 210/167.04 |
| 6,585,888 B2 * | 7/2003 | Axelrod | 210/167.22 |
| 6,902,666 B1 * | 6/2005 | Foronda, Jr. | 210/167.25 |
| 6,962,660 B2 * | 11/2005 | Wybo | 210/315 |
| 7,208,084 B2 * | 4/2007 | Axelrod | 210/167.21 |
| 2003/0141237 A1* | 7/2003 | Dixon | 210/266 |
| 2005/0155165 A1* | 7/2005 | Tsai | 15/1.7 |
| 2006/0289347 A1* | 12/2006 | Anasa Haley | 210/167.12 |

* cited by examiner

*Primary Examiner*—Fred Prince
(74) *Attorney, Agent, or Firm*—Rosenberg, Klein & Lee

(57) ABSTRACT

The present invention relates to a filtration device of water pump comprising a water inlet at the water inlet end and a water outlet at the water outlet end, water flow being caused by the impeller, which is driven by the power source, to move from the water inlet to the water outlet, wherein one or more filtration device(s) is(are) assembled in at least one of the water inlet end and the water outlet end, and thereby clean water is obtained by the water passing through the filtration device along with the pumping action conducted by the water pump. Therefore, both effects of providing water flow with sufficient water pressure and clean water quality can be achieved therewith.

9 Claims, 9 Drawing Sheets

FILTRATION DEVICE OF WATER PUMP

BACKGROUND OF THE INVENTION

1. Field of the Invention

The present invention relates to a filtration device of water pump, more particularly to a water pump which enables both water pumping and water filtering actions simultaneously. By the providing of filtration device at the water inlet end and/or the water outlet end, both effects of sufficiency in water supply and purification of water can be achieved.

2. Brief Description of the Prior Art

Generally, water pump is widely adapted in usual family and mansion for pumping water up to the water reservoir installed at the roof, with a purpose in response to the fact that water flow quantity becomes smaller as the water consumption becomes larger in the case without installing a pump. Due to the fact that water is not always clean during the pumping process, a filter is often provided within the water pump as a means for water cleaning. There is a conventional filtration device of water pump in which an impeller, driven by a motor, is rotationally provided within a hollow housing, and a water inlet and a water outlet are provided respectively at the water inlet end and the water outlet end of the housing, characterized in that the housing is extended at both the water inlet end and the water outlet end to form sleeves. Water filters are secured within both sleeves. The ends of the sleeves are the above-mentioned water inlet and the water outlet respectively. When in use, the motor is started to rotate the impeller so that water enters into the water inlet and exits from the water outlet, and water is filtered through these two filters. However, the filtering path of these two filters provided in the water pump of the above-mentioned structure is too short to achieve effective filtered water quality.

Furthermore, the selection of the water pipe size is dependent on the water consumption quantity of each house or each unit of mansion, so water pipe size is not all the same in each house or each unit of mansion. The installation of water pump and the connection of water pump with the water pipe should be accomplished by the joint of the same diameter as the water pipe so as not to affect the water pressure head. Therefore, the water pipe size at the user's installation site should be investigated at first before the installation of a water pump. Excessive or insufficient water pressure head will be caused if improper size of joint is used. This will often cause incapability of proper connection between the water pump and the water pipe.

SUMMARY OF THE INVENTION

The object of this invention is to provide a filtration device of water pump which not only provides water pumping function but also has the advantage of water purifying effect, so that the defects present in the existed device can be completely improved.

A filtration device of water pump of the present invention, comprising a water inlet at the water inlet end and a water outlet at the water outlet end, water flow being caused by the impeller, which is driven by the power source, to move from the water inlet to the water outlet, wherein one or more filtration device(s) is(are) assembled in at least one of the water inlet end and the water outlet end and thereby clean water is obtained by the water passing through the filtration device along with the pumping action conducted by the water pump. Therefore, both effects of providing water flow with sufficient water pressure head and clean water quality can be achieved therewith.

BRIEF DESCRIPTION OF THE DRAWINGS

The present invention will be better understood by the detailed description of preferred embodiments in reference to the accompanied drawings, wherein.

DETAILED DESCRIPTION OF THE PREFERRED EMBODIMENTS

The technical content, objects and effectiveness of the present invention will become more apparent by the detailed description of the following preferred embodiments of the present invention in reference to the accompanied drawings.

Figure 1:
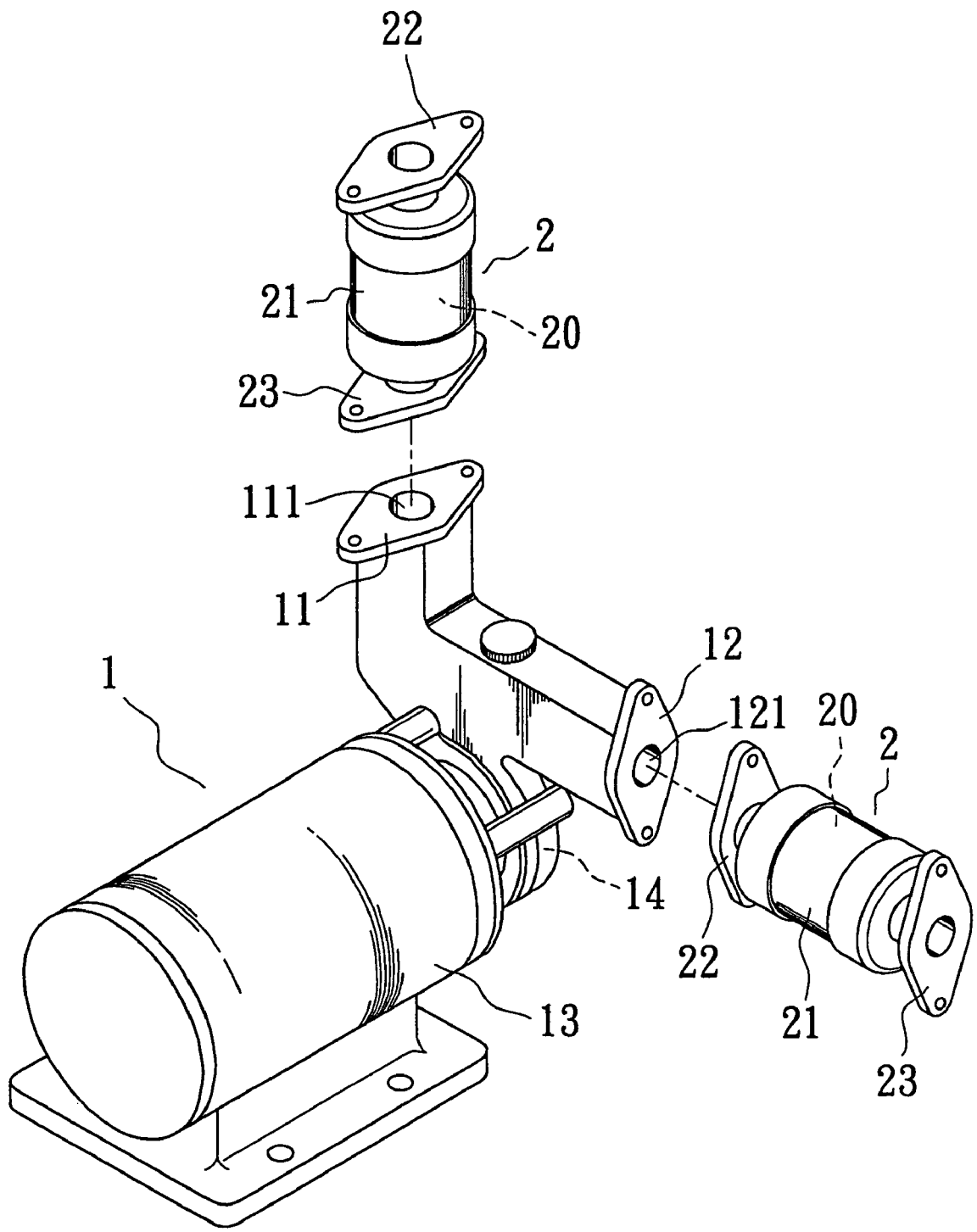
FIG. 1 is a detached perspective view of the present invention.
Figure 2:
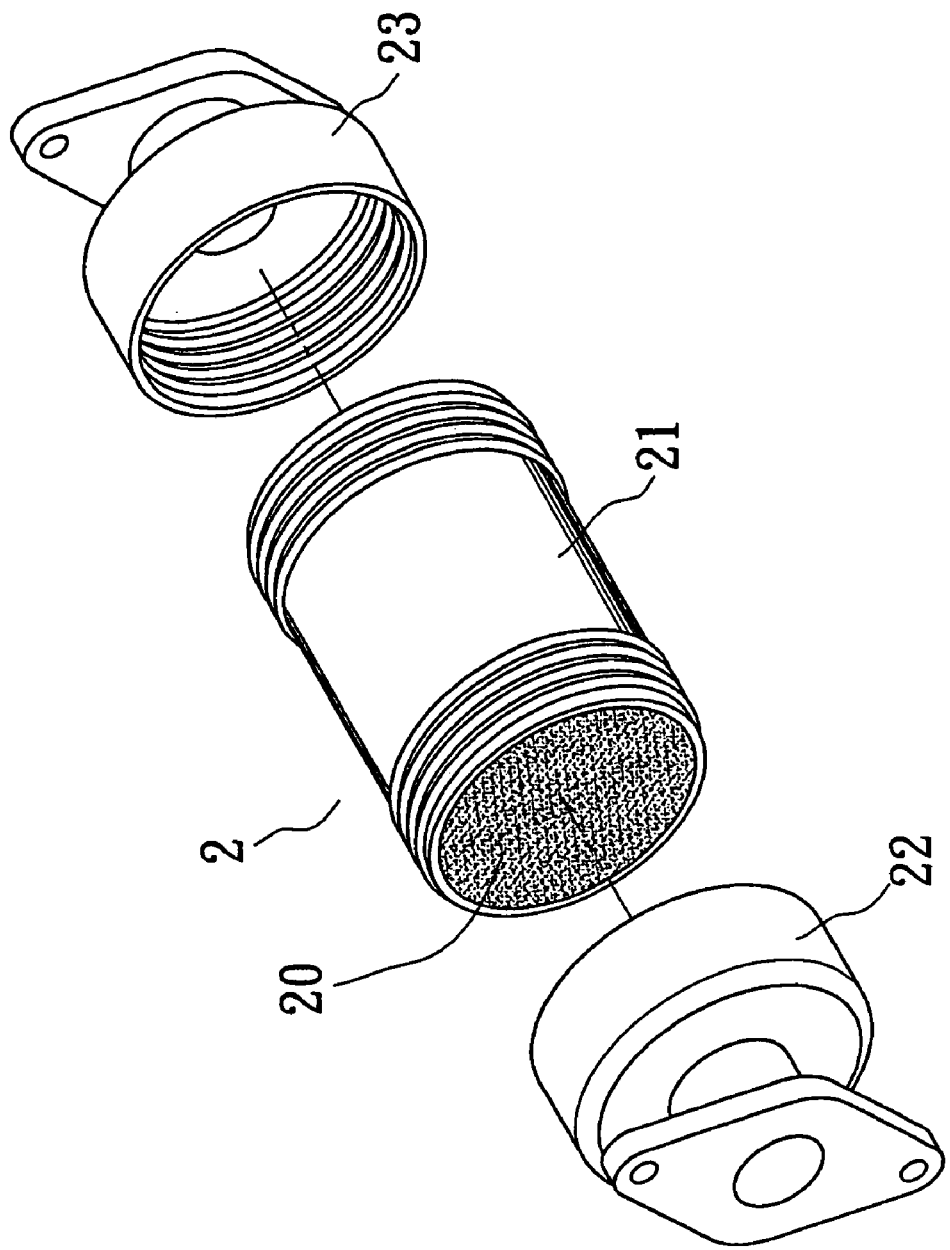
FIG. 2 is a schematic detached view showing the filtration device of the present invention.

Firstly referring to FIG. 1, a detached perspective view of the filtration device of water pump of the present invention is shown. The water pump (1) comprises a water inlet (121) at the water inlet end (12) and a water outlet (111) at the water outlet end (11), water flow being caused by the impeller (14), which is driven by the power source (13), to move from the water inlet (12) to the water outlet (11), wherein one or more filtration device(s) (2) is(are) assembled in at least one of the water inlet (121) of the water inlet end (12) and the water outlet (111) of the water outlet end (11). As shown in FIG. 2, the filtration device(s) (2) has a main body (21) having filtering material (20) provided inside and an inlet joint (23) as well as an outlet joint (22) being in thread engagement at both ends of the main body respectively. The inlet joint (23) and the outlet joint (22) can be connected with the water inlet end (12) and the water outlet end (11) respectively.

Figure 3:
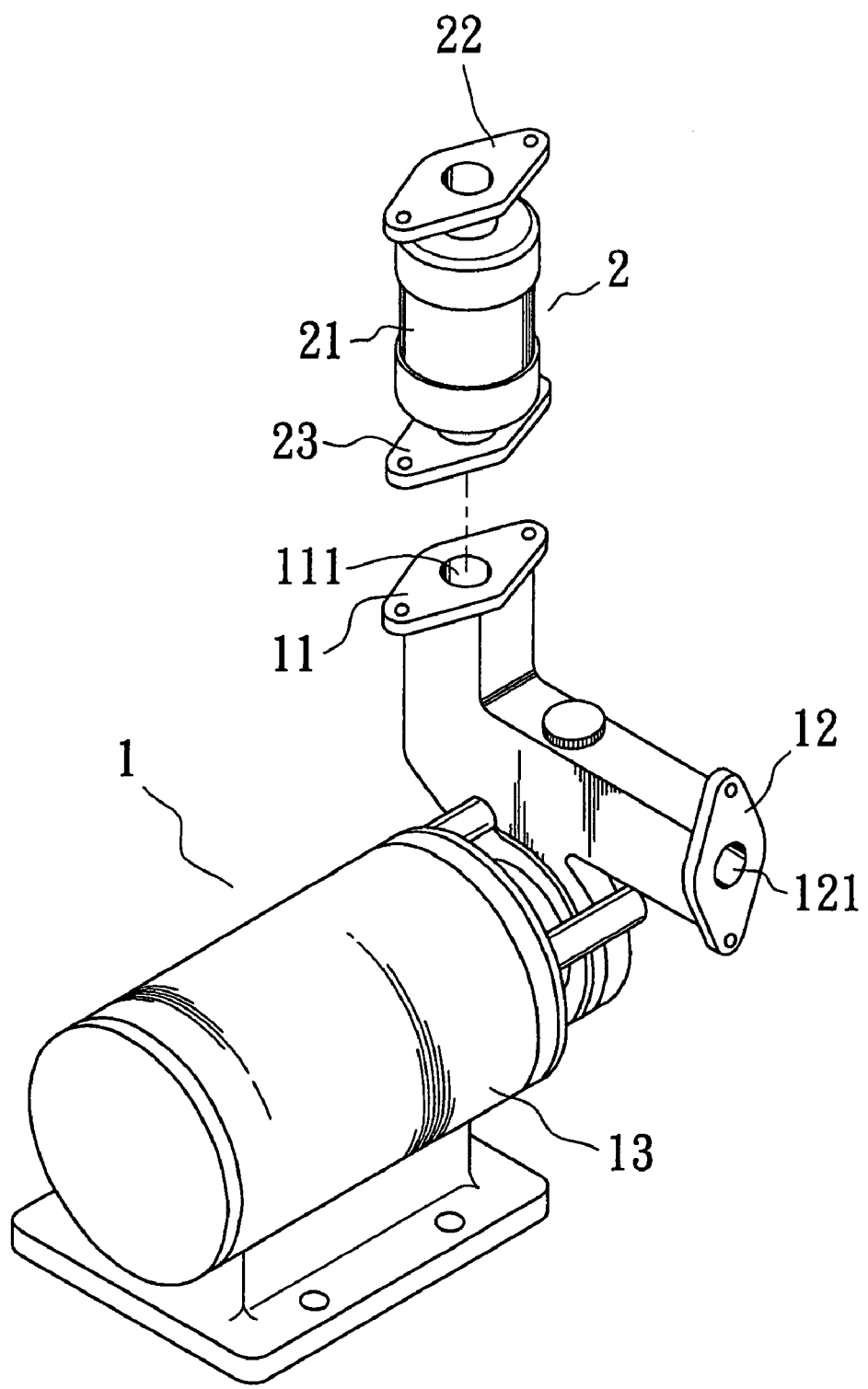
FIG. 3 is a schematic detached view showing the first embodiment of the present invention.
Figure 4:
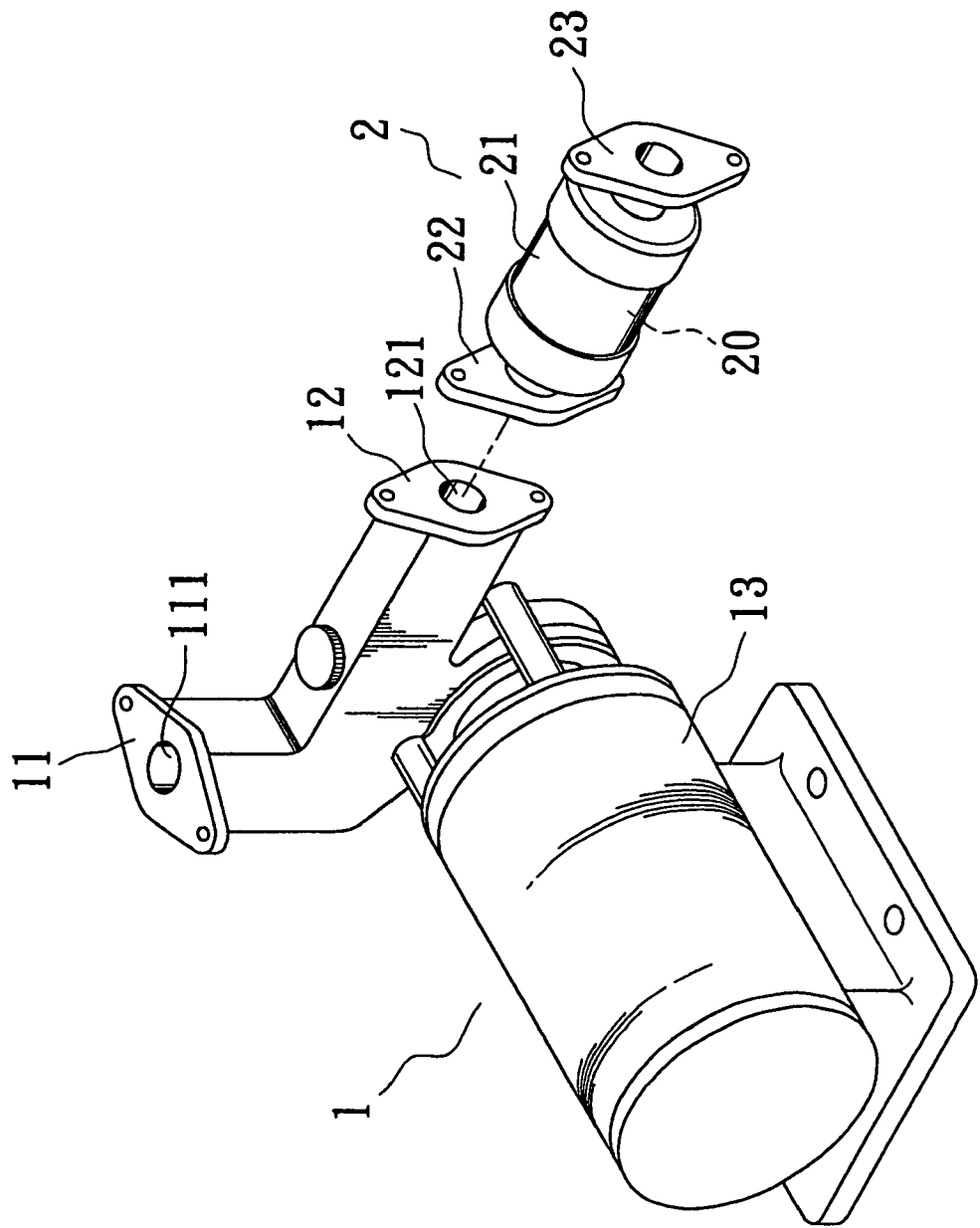
FIG. 4 is a schematic detached view showing the second embodiment of the present invention.
Figure 5:
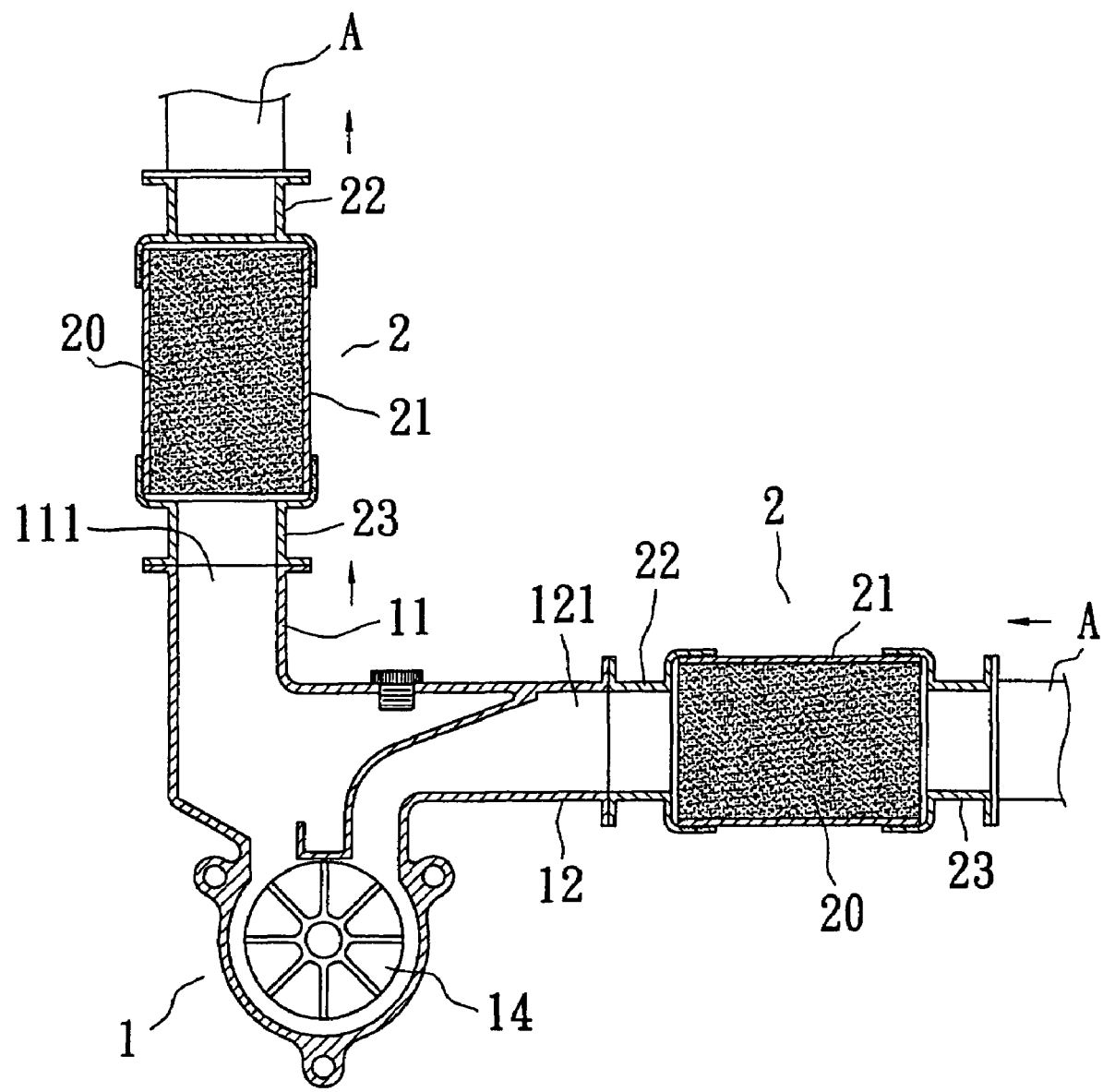
FIG. 5 is a schematic sectional view showing the third embodiment of the present invention.

Referring to FIG. 3, a schematic detached view of the first embodiment of the present invention is shown. During the installation, the water outlet (111) of the water outlet end (11) of the water pump (1) is assembled with the filtration device (2), while the inlet joint (23) of the filtration device (2) is secured to the water outlet end (11). Alternatively, as shown in a schematic detached view of the second embodiment in FIG. 4, the water inlet (121) of the water inlet end (12) of the water pump (1) is assembled with the filtration device (2), while the outlet joint (22) of the filtration device (2) is secured to the water inlet end (12). Referring to FIG. 5, a schematic sectional view of the third embodiment of the present invention is shown. In the third embodiment of the present invention, each of the water outlet end (11) and the water inlet end (12) of the water pump (1) is assembled with a filtration device (2) in such a manner that the water outlet end (11) is assembled with the inlet joint (23) of the filtration device (2) and the outlet joint (22) of the filtration device (2) is connected to the water pipe (A) at the water reservoir side, while the water inlet end (12) of the water pump (1) is assembled with the outlet joint (22) of the filtration device (2) and the inlet joint (23) of the filtration device (2) at the other end is connected to the water pipe (A) at the water supply side. As shown in FIG. 1, water flowing through the water pipe (A) at the water supply side enters into the filtration device (2), in which the water filtering action is conducted, then enters into the water pump (1) from the water inlet end (12), in which the water pumping action is conducted, and then flows through the filtration device (2) at the water outlet end (11), in which the water filtering action is again conducted, and finally the water thus purified is delivered to the water reservoir.

Figure 6:
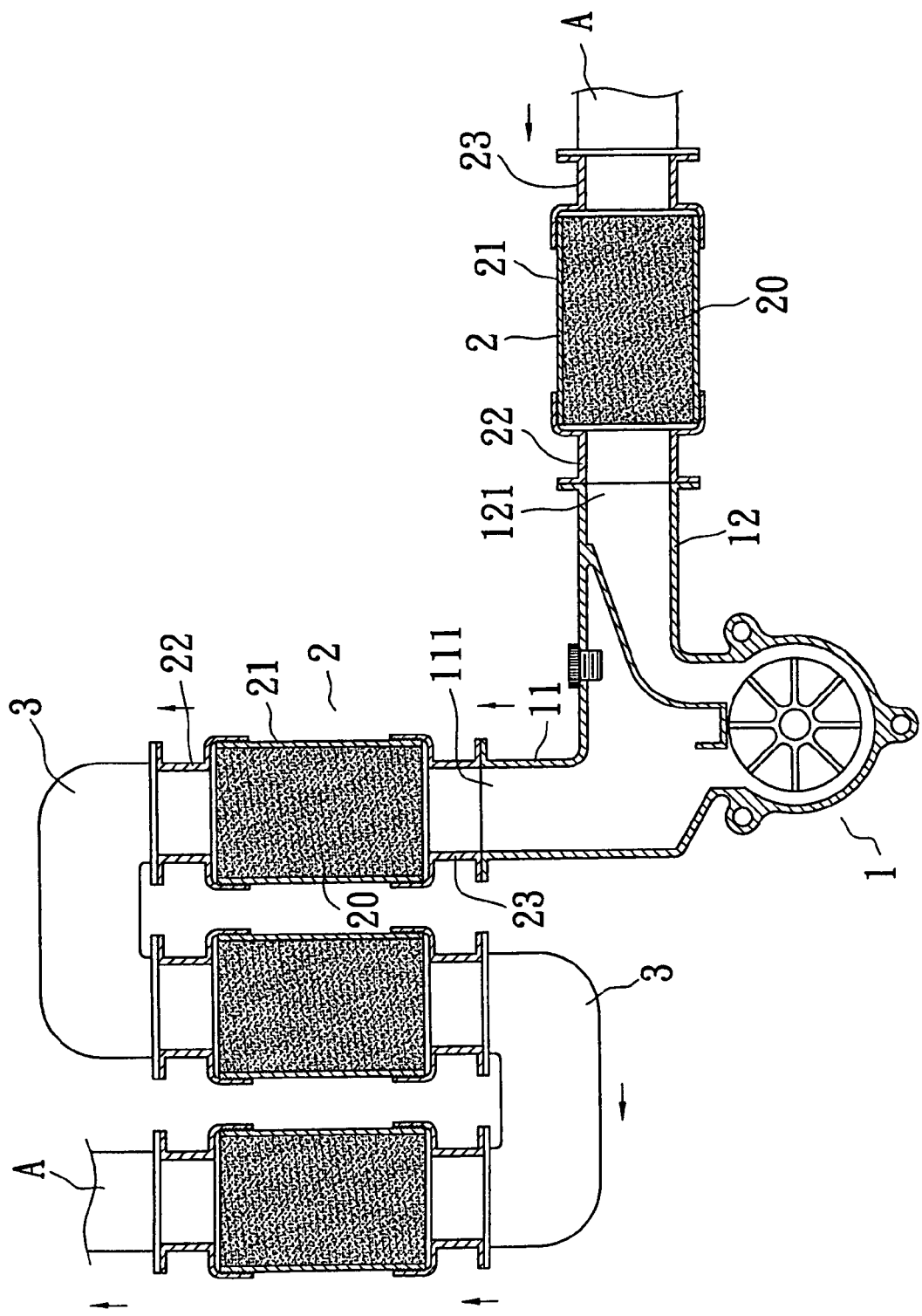
FIG. 6 is a schematic sectional view showing the fourth embodiment of the present invention.

Furthermore, referring to FIG. 6, a schematic sectional view of the fourth embodiment of the present invention is shown. As shown in FIG. 6, the number of the filtration device (2) provided at either side of the water inlet end (12) and the water outlet end (11) is more than one, and an elbow joint (3) is used to connect between the outlet joint (22) and the inlet joint (23) of any two adjacent filtration devices (2), so as to achieve serial communication thereof.

Figure 7:
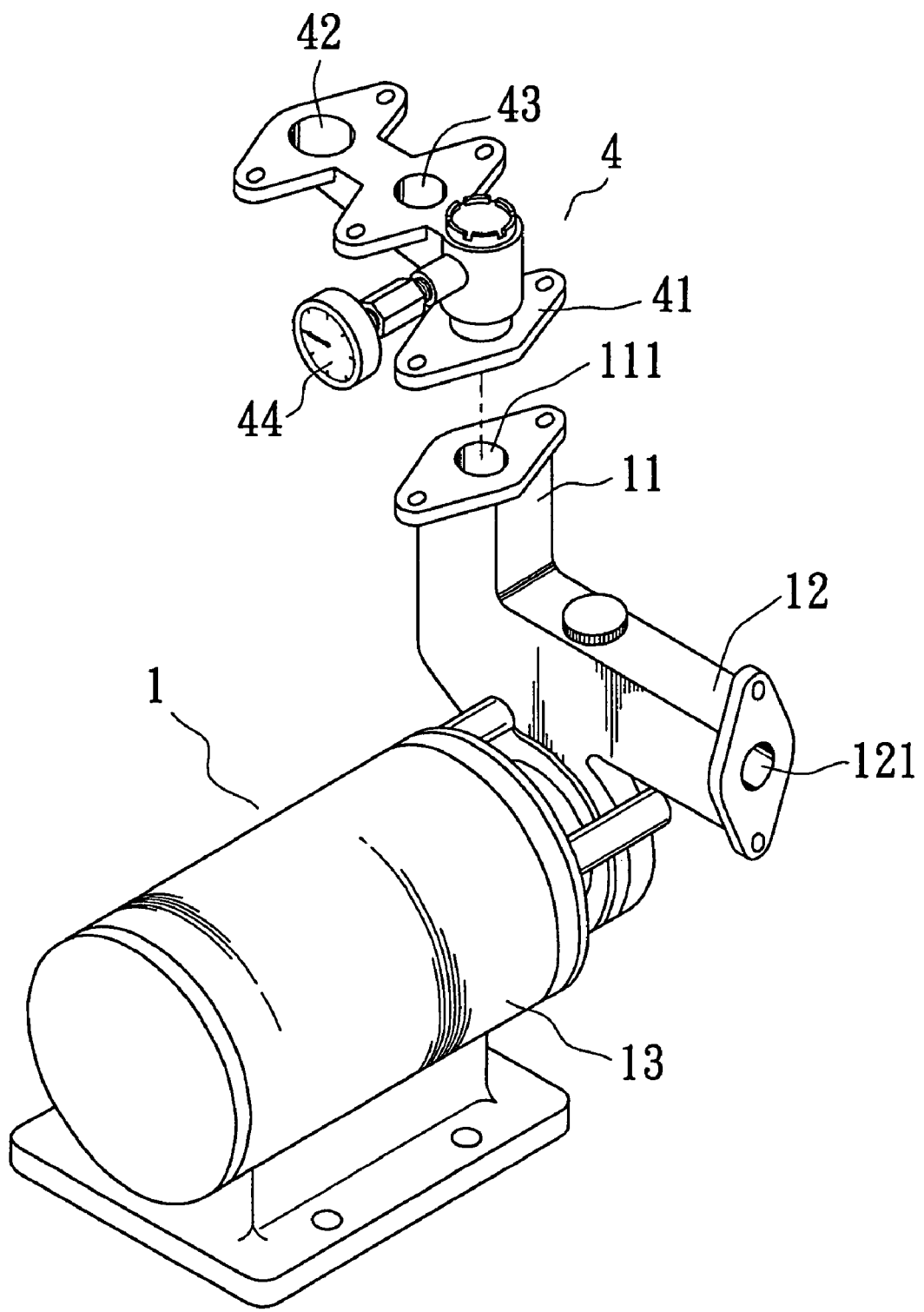
FIG. 7 is a schematic detached view showing the fifth embodiment of the present invention.
Figure 8:
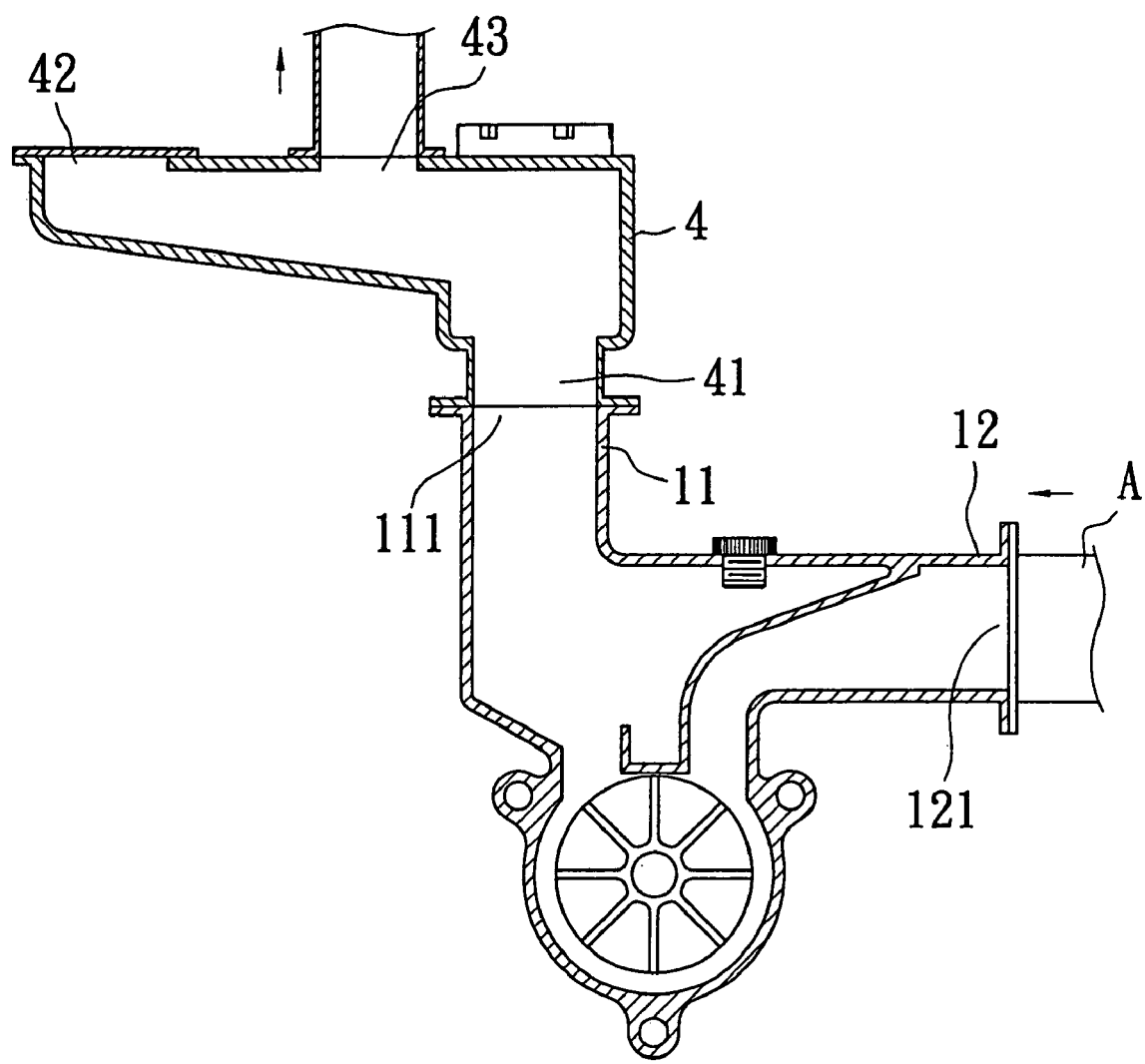
FIG. 8 is a schematic sectional view (I) showing the fifth embodiment of the present invention.
Figure 9:
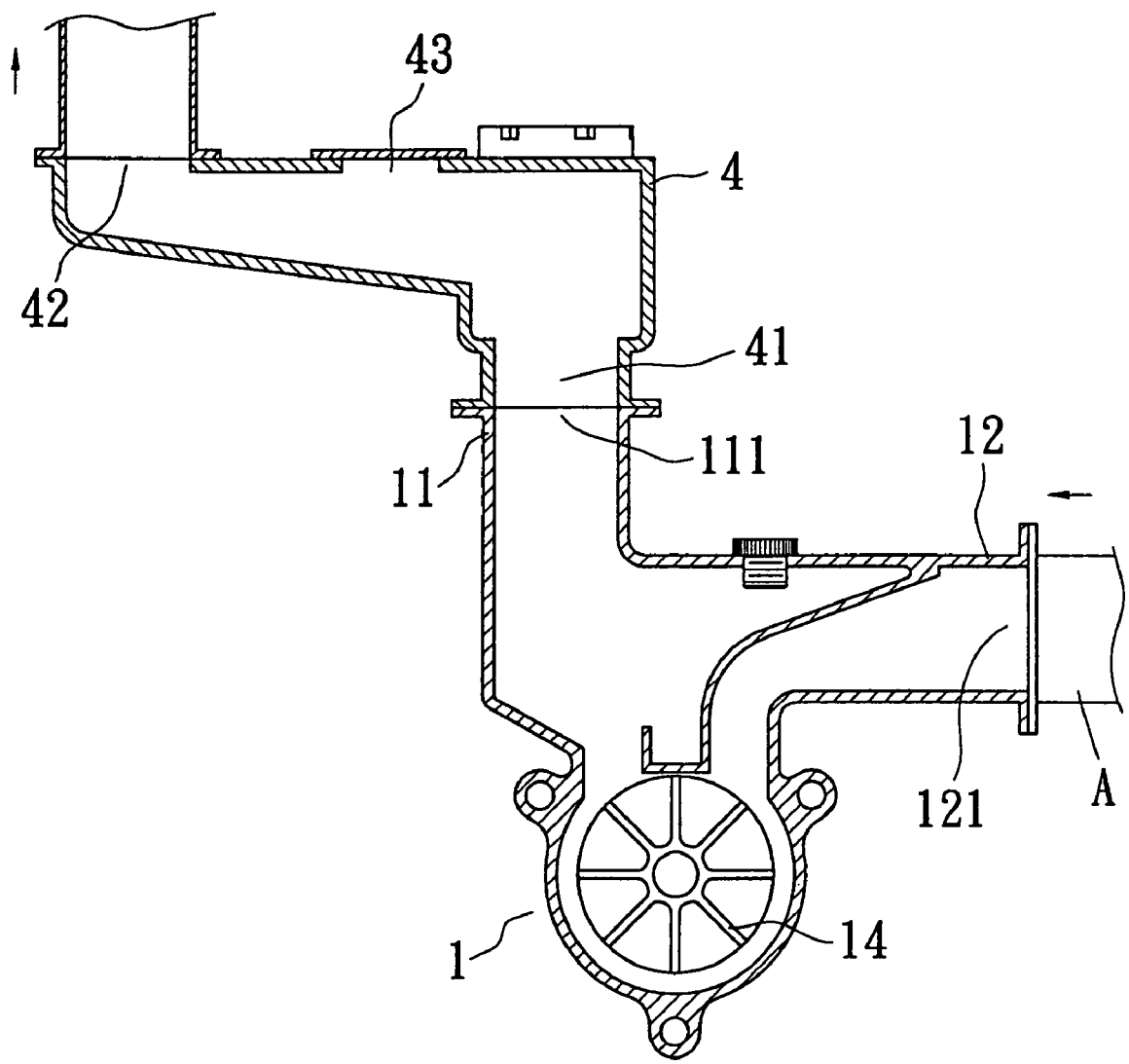
FIG. 9 is a schematic sectional view (II) showing the fifth embodiment of the present invention.

Furthermore, a schematic detached view showing the fifth embodiment of the present invention is shown in FIG. 7. As shown in FIG. 7, a versatile pipe joint (4) is assembled to the water outlet end (11) of the water pump (1). The versatile pipe joint (4) has its inlet joint (41) connected to the water outlet end (11), and a joint (42) with a large diameter connection port and a joint (43) with a small diameter connection port, which can be selectively fitted with the diameter of the water pipe (A) at the water reservoir side. In addition, a pressure gauge (44) is provided at the versatile pipe joint (4) for measuring the water pressure so as to assure safety. As shown in FIG. 8, when the diameter of the water pipe (A) at the water reservoir side is a smaller one, the joint (42) with large diameter connection port is blocked after the inlet joint (41) of the versatile pipe joint (4) is fitted to the water outlet end (11) of the water pump (1), and then the water pipe (A) at the water reservoir side is connected to the joint (43) with small diameter connection port. On the contrary, as shown in FIG. 9, when the diameter of the water pipe (A) at the water reservoir side is a larger one, the joint (43) with small diameter connection port is blocked after the inlet joint (41) of the versatile pipe joint (4) is fitted to the water outlet end (11) of the water pump (1), and then the water pipe (A) at the water reservoir side is connected to the joint (43) with large diameter connection port.

While the present invention has been described with above preferred embodiments with reference to the accompanied drawings, however the structure and the dimension of the present invention is not limited to the above embodiment and the accompanied drawings. The modifications and variations made by the person skilled in the art without departing from the scope and spirit of the present invention should be considered as in the range of the present invention.

In summary, the filtration device of water pump of the present invention has more advantages when comparing with the conventional skill.

1). The water inlet end and/or the water outlet end of water pump can provided with filtration device(s). Excellent filtering effect and purifying effect can be achieved if appropriate filtering path is provided.

2). A plurality of filtration devices can be assembled to the water inlet end and/or the water outlet end of water pump. Excellent filtering effect and purifying effect can be achieved if appropriate filtering path is provided.

3). In a filtration device of water pump, the design of a joint with a large diameter connection port and a small diameter connection port is favorable for connection in response to the diameter of the water pipe at the water reservoir side.

What is claimed is:

1. A filtration device of water pump, comprising a water inlet at a water inlet end and a water outlet at a water outlet end, water flow being caused by an impeller, driven by a power source, to move from the water inlet end to the water outlet end,
   wherein a plurality of filtration devices serially coupled whereby an output of one defines an input of another, said plurality of filtration devices connecting to said water outlet of the water outlet end of the water pump, each said filtration device having a main body including filtering material inside, and inlet and outlet joints in threaded engagement at opposed ends of said main body respectively, said inlet joint of one said filtration device being secured to said water outlet end of the water pump.

2. The filtration device of water pump as claimed in claim 1, wherein each adjacent pair of said filtration devices are connected with an elbow joint extending between the respective outlet joint and the inlet joint thereof.

3. The filtration device of water pump as claimed in claim 1, further comprising a versatile pipe joint coupled to one of said water inlet and outlet to adaptably extend a corresponding one of said water inlet and outlet ends of said water pump, said versatile pipe joint defining a plurality of selectable connection ports of different diametric dimension disposed in open communication with said corresponding one of said water inlet and outlet ends.

4. A filtration device of water pump, comprising a water inlet at a water inlet end and a water outlet at a water outlet end, water flow being caused by an impeller driven by a power source, to move from the water inlet end to the water outlet end, wherein:
   a plurality of filtration devices serially coupled whereby an output of one defines an input of another, said plurality of filtration devices connecting to said water inlet of the water inlet end of the water pump, each said filtration device having a main body including filtering material inside, and inlet and outlet joints in threaded engagement at opposed ends of said main body respectively, said outlet joint of one said filtration device being secured to said water inlet end of the water pump.

5. The filtration device of water pump as claimed in claim 4, wherein each adjacent pair of said filtration devices are connected with an elbow joint extending between the respective outlet joint and the inlet joint thereof.

6. The filtration device of water pump as claimed in claim 4, further comprising a versatile pipe joint coupled to one of said water inlet and outlet to adaptably extend a corresponding one of said water inlet and outlet ends of said water pump, said versatile pipe joint defining a plurality of selectable connection ports of different diametric dimension disposed in open communication with said corresponding one of said water inlet and outlet ends.

7. A filtration device of water pump, comprising a water inlet at a water inlet end and a water outlet at a water outlet end, water flow being caused by an impeller driven by a power source, to move from the water inlet end to the water outlet end, wherein:
   each of said water outlet of the water outlet end and said water inlet of the water inlet end of the water pump is assembled with a plurality of filtration devices serially coupled whereby an output of one defines an input of another, each said filtration device having a main body including filtering material inside, and inlet and outlet joints in threaded engagement at opposed ends of said main body respectively, said inlet joint of one said filtration device and said outlet joint of another said filtration device being secured to said water inlet end and said water outlet end respectively.

8. The A filtration device of water pump as claimed in claim 7, wherein each adjacent pair of said filtration devices are connected with an elbow joint extending between the respective outlet joint and the inlet joint thereof.

9. The filtration device of water pump as claimed in claim 7, further comprising a versatile pipe joint coupled to one of said water inlet and outlet to adaptably extend a corresponding one of said water inlet and outlet ends of said water pump, said versatile pipe joint defining a plurality of selectable connection ports of different diametric dimension disposed in open communication with said corresponding one of said water inlet and outlet ends.

* * * * *